United States Patent
Pan et al.

(10) Patent No.: US 10,974,320 B2
(45) Date of Patent: Apr. 13, 2021

(54) NOZZLE AND ADDITIVE MANUFACTURING APPARATUS

(71) Applicant: Kabushiki Kaisha Toshiba, Minato-ku (JP)

(72) Inventors: Shanying Pan, Yokohama (JP); Hiroshi Ohno, Yokohama (JP); Hideshi Nakano, Yokosuka (JP); Kotaro Kobayashi, Mie (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 408 days.

(21) Appl. No.: 15/504,537

(22) PCT Filed: Mar. 17, 2015

(86) PCT No.: PCT/JP2015/057962
§ 371 (c)(1),
(2) Date: Feb. 16, 2017

(87) PCT Pub. No.: WO2016/042809
PCT Pub. Date: Mar. 24, 2016

(65) Prior Publication Data
US 2017/0232519 A1    Aug. 17, 2017

(30) Foreign Application Priority Data
Sep. 17, 2014  (JP) .............................. JP2014-189206

(51) Int. Cl.
*B22F 3/105*   (2006.01)
*B23K 26/144*  (2014.01)
(Continued)

(52) U.S. Cl.
CPC ............ *B22F 3/1055* (2013.01); *B23K 26/14* (2013.01); *B23K 26/144* (2015.10);
(Continued)

(58) Field of Classification Search
CPC .... B23K 26/144; B23K 26/147; B23K 26/14; B22F 2003/1056; B33Y 30/00; B29C 64/209
See application file for complete search history.

(56) References Cited

U.S. PATENT DOCUMENTS 4,925,103 A *  5/1990  Muench ................. B05B 5/00
                                              118/300
5,122,632 A    6/1992  Kinkelin
(Continued)

FOREIGN PATENT DOCUMENTS

CN    102671794 A    9/2012
CN    102744172 A    10/2012
(Continued)

OTHER PUBLICATIONS

International Search Report dated Jun. 2, 2015 in PCT/JP2015/057962 filed Mar. 17, 2015.

*Primary Examiner* — Seyed Masoud Malekzadeh
(74) *Attorney, Agent, or Firm* — Oblon, McClelland, Maier & Neustadt, L.L.P.

(57) ABSTRACT

A nozzle includes an ejection section and an acceleration section. A powder is configured to be ejected from the ejection section. The acceleration section is configured to allow the powder to circle around and is configured to accelerate the powder in a peripheral direction of the powder that circles around so as to transport the powder to an opening.

8 Claims, 10 Drawing Sheets

(51) Int. Cl.
*B23K 26/14* (2014.01)
*B33Y 30/00* (2015.01)
*B29C 64/209* (2017.01)
*B33Y 40/00* (2020.01)
*B23K 26/34* (2014.01)

(52) U.S. Cl.
CPC ............ *B23K 26/147* (2013.01); *B23K 26/34* (2013.01); *B33Y 30/00* (2014.12); *B33Y 40/00* (2014.12); *B22F 2003/1056* (2013.01); *B29C 64/209* (2017.08); *Y02P 10/25* (2015.11)

(56) References Cited

U.S. PATENT DOCUMENTS

| | | | | |
|---|---|---|---|---|
| 5,837,960 | A * | 11/1998 | Lewis | B29C 64/153 219/121.63 |
| 7,703,479 | B2 * | 4/2010 | Jacob | B64C 23/005 137/828 |
| 2012/0040581 | A1 | 2/2012 | Kim | |
| 2017/0232519 | A1 * | 8/2017 | Pan | B23K 26/144 425/3 |

FOREIGN PATENT DOCUMENTS

| | | |
|---|---|---|
| CN | 203061328 U | 7/2013 |
| DE | 39 35 009 A1 | 4/1991 |
| JP | 08-126856 A | 5/1996 |
| JP | 09-295350 A | 11/1997 |
| JP | 2002-69603 A | 3/2002 |
| JP | 2005-290518 A | 10/2005 |
| JP | 2010-120138 A | 6/2010 |
| JP | 2011-218409 A | 11/2011 |

* cited by examiner

NOZZLE AND ADDITIVE MANUFACTURING APPARATUS

CROSS-REFERENCE TO RELATED APPLICATIONS

This application is national stage application of International Application No. PCT/JP2015/057962, filed Mar. 17, 2015, which designates the United States, incorporated herein by reference, and which is based upon and claims the benefit of priority from Japanese Patent Application No. 2014-189206, filed Sep. 17, 2014, the entire contents of which are incorporated herein by reference.

FIELD

Embodiments described herein relate generally to a nozzle and an additive manufacturing apparatus.

BACKGROUND

In the related art, an additive manufacturing apparatus, which forms an additive manufactured object in an addition manner, is known. The additive manufacturing apparatus forms a layer of a material by supplying a powder of a material from a nozzle and simultaneously irradiating the powder with laser light to melt the powder, and the layer is stacked to form an additive manufactured object.

DETAILED DESCRIPTION

According to one embodiment, a nozzle includes an ejection section and an acceleration section. A powder is configured to be ejected from the ejection section. The acceleration section is configured to allow the powder to circle around and is configured to accelerate the powder so as to transport the powder to an opening.

Hereinafter, a description will be given of the first embodiment with reference to FIG. 1 to FIG. 4. Furthermore, in this specification, basically, a vertically upward direction is defined as an upward direction, and a vertically downward direction is defined as a downward direction. In addition, a plurality of expressions may be written with respect to constituent elements according to embodiments.

Figure 1:
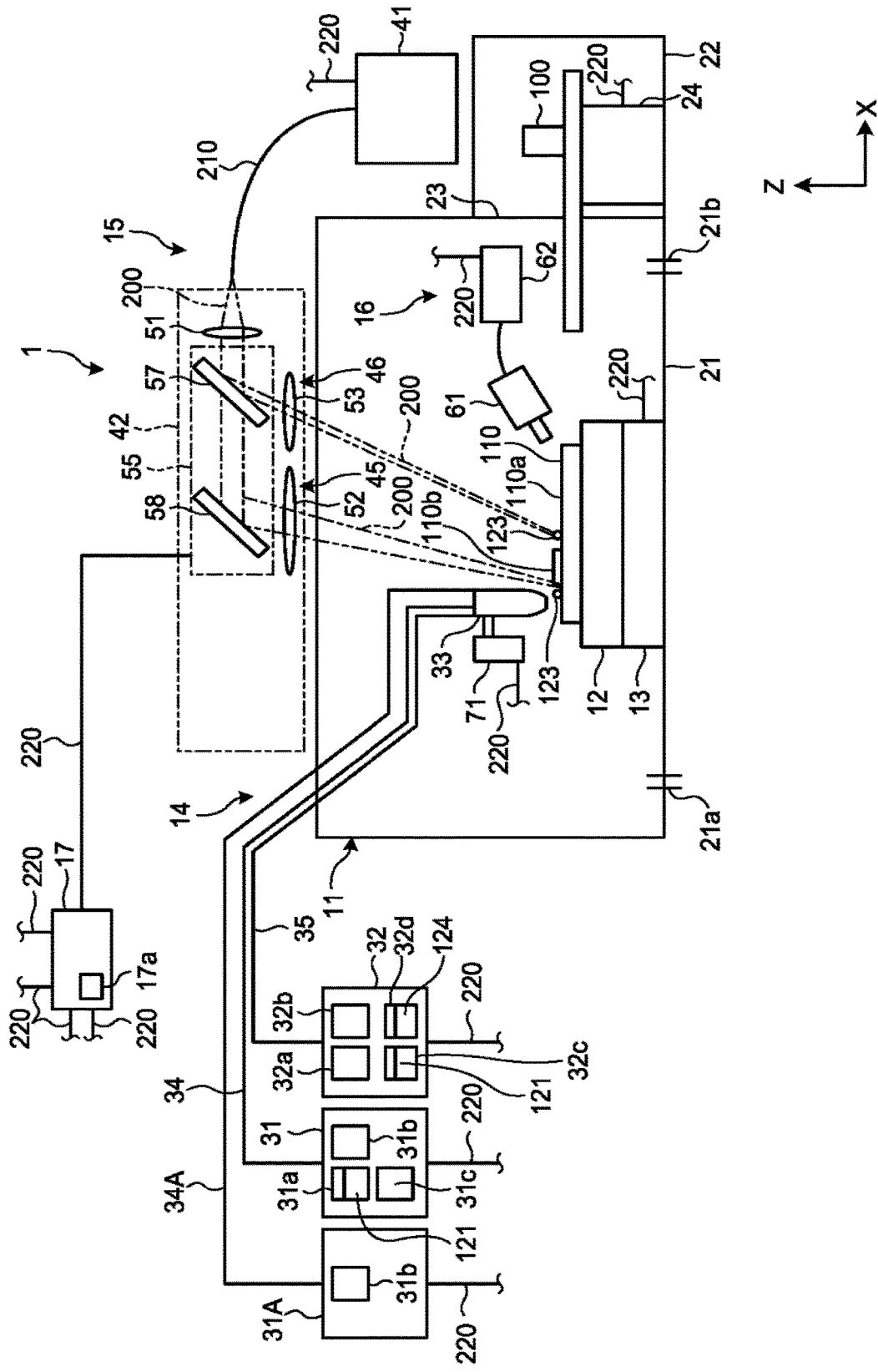
FIG. 1 is a view schematically illustrating an additive manufacturing apparatus according to the first embodiment.

FIG. 1 is a view schematically illustrating an additive manufacturing apparatus 1 according to the first embodiment. As illustrated in FIG. 1, the additive manufacturing apparatus 1 includes a processing tank 11, a stage 12, a moving device 13, a nozzle device 14, an optical device 15, a measurement device 16, and a control device 17.

In this specification, an X-axis, a Y-axis, and a Z-axis are defined as illustrated in the drawing. The X-axis, the Y-axis, and the Z-axis are perpendicular to each other. For example, the Z-axis lies along the vertical direction. Furthermore, the additive manufacturing apparatus 1 may be disposed in such a manner that the Z-axis is inclined from the vertical direction.

For example, the additive manufacturing apparatus 1 stacks a material 121, which is supplied from the nozzle device 14, on a target 110 that is disposed on the stage 12 in a layer shape to manufacture an additive manufactured object 100 having a predetermined shape. The material 121 is an example of a powder.

The target 110 is a target to which the material 121 is supplied by the nozzle device 14, and includes a base 110a and a layer 110b. A plurality of the layers 110b are laminated on an upper face of the base 110a. For example, the material 121 is a powder-shaped metallic material such as an iron powder. Furthermore, the material 121 is not limited to thereto, and may be other materials such as a synthetic resin and ceramics. The additive manufacturing apparatus 1 manufactures the additive manufactured object 100 by using one or more kinds of materials 121.

A main chamber 21 and a sub-chamber 22 are provided in the processing tank 11. The sub-chamber 22 is provided to be adjacent to the main chamber 21. A door 23 is provided between the main chamber 21 and the sub-chamber 22. When the door 23 is opened, the main chamber 21 and the sub-chamber 22 communicate with each other. When the door 23 is closed, the main chamber 21 enters an air-tight state.

An inlet port 21a and an exhaust port 21b are provided in the main chamber 21. When an air supply device (not illustrated) operates, an inert gas such as nitrogen and argon is supplied into the main chamber 21 through the inlet port 21a. When an exhaust device (not illustrated) operates, a gas inside the main chamber 21 is discharged from the main chamber 21 through the exhaust port 21b. Furthermore, the additive manufacturing apparatus 1 may discharge the gas inside the main chamber 21 through the exhaust port 21b in order for the main chamber 21 to enter a vacuum state.

A transfer device (not illustrated) is provided in the main chamber 21. In addition, a conveying device 24 is provided in a portion ranging from the main chamber 21 to the sub-chamber 22. The transfer device transfers the additive manufactured object 100, which is processed in the main chamber 21, to the conveying device 24. The conveying device 24 conveys the additive manufactured object 100, which is transferred from the transfer device, into the sub-chamber 22. That is, the additive manufactured object 100, which is processed in the main chamber 21, is accommodated in the sub-chamber 22. After the additive manufactured object 100 accommodated in the sub-chamber 22, the door 23 is closed, and thus the sub-chamber 22 and the main chamber 21 are isolated from each other.

The stage 12, the moving device 13, a part of the nozzle device 14, and the measurement device 16 are provided in the main chamber 21.

The stage 12 supports the target 110. For example, the moving device 13 (moving mechanism) moves the stage 12 in three axial directions perpendicular to each other.

The nozzle device 14 supplies the material 121 to the target 110 on the stage 12. The nozzle device 14 can supply a plurality of the materials 121 in parallel with each other, and can selectively supply one of the plurality of materials 121.

The nozzle device 14 includes a supply device 31, a supply device 31A, a discharge device 32, a nozzle 33, a supply tube 34, a supply tube 34A, and a discharge tube 35. The supply device 31 transports the material 121 to the nozzle 33 through the supply tube 34. The supply device 31A transports a gas to the nozzle 33 through the supply tube 34A. Furthermore, the material 121 is transported from the nozzle 33 to the discharge device 32 through the discharge tube 35. Furthermore, the additive manufacturing apparatus 1 may not include the supply device 31A, the discharge device 32, the supply tube 34A, and the discharge tube 35.

The supply device 31 includes a tank 31a, a supply unit 31b, and a charging unit 31c. The tank 31a accommodates the material 121. The supply unit 31b supplies the material 121 in the tank 31a to the nozzle 33. The charging unit 31c allows the material 121, which is supplied to the nozzle 33 by the supply unit 31b, to charges negative, for example, through corona discharging. Furthermore, the charging unit 31c may charge the material 121 by another means, or may allow the material 121 to charge positive. In addition, the charging unit 31c may charge the material 121 that is accommodated in the tank 31a.

The supply device 31A includes a supply unit 31b. The supply device 31A supplies a gas such as a carrier gas and a shield gas to the nozzle 33. For example, the gas is an inert gas such as nitrogen and argon.

The discharge device 32 includes a classifying device 32a, a discharge unit 32b, and tanks 32c and 32d. The discharge unit 32b suctions a gas from the nozzle 33. The classifying device 32a separates the material 121 and fume in the gas that is suctioned by the discharge unit 32b. The tank 32c accommodates the material 121, and the tank 32d accommodates the fume 124. According to this, a powder of the material 121 that is not used for manufacturing, fume (metallic fume), dust, and the like that is generated through the manufacturing are discharged from a processing region in combination with the gas. For example, the discharge unit 32b is a pump.

In addition, as illustrated in FIG. 1, the optical device 15 includes a light source 41 and an optical system 42. The light source 41 includes an oscillation element (not illustrated), and emits laser light 200 through oscillation of the oscillation element. The light source 41 can change a power density of the laser light 200 that is emitted.

The laser light 200 is an example of an energy ray. Furthermore, the light source 41 may emit a different energy ray without limitation to the laser light 200. The energy ray may melt the material 121 similar to the laser light 200, and may be, for example, an electron beam, and an electromagnetic wave in a range from a micro wave to an ultraviolet ray.

The light source 41 is connected to the optical system 42 through a cable 210. For example, the optical system 42 includes a first lens 51, a second lens 52, a third lens 53, and a galvano scanner 55. The first lens 51, the second lens 52, and the third lens 53 are fixed. Furthermore, the optical system 42 may include an adjustment device that can move the first lens 51, the second lens 52, and the third lens 53, for example, in two axial directions that intersects (is perpendicular to) an optical path.

The first lens 51 converts the laser light 200, which is incident through the cable 210, into parallel light. The laser light 200, which is converted, is incident to the galvano scanner 55.

The second lens 52 converges the laser light 200 that is emitted from the galvano scanner 55. The laser light 200, which is converged in the second lens 52, is emitted onto the target 110.

The third lens 53 converges the laser light 200 that is emitted from the galvano scanner 55. The laser light 200, which is converged in the third lens 53, is emitted onto the target 110.

The galvano scanner 55 divides the parallel light, which is converted in the first lens 51, into light beams which are respectively incident to the second lens 52 and the third lens 53. The galvano scanner 55 includes a first galvano mirror 57 and a second galvano mirror 58. Each of the galvano mirrors 57 and 58 divides light, and an inclination angle (emission angle) thereof can be changed.

The first galvano mirror 57 allows a part of the laser light 200, which passes through the first lens 51, to pass through the first galvano mirror 57, and emits the laser light 200, which passes through the first galvano mirror 57, to the second galvano mirror 58. In addition, the first galvano mirror 57 reflects other part of the laser light 200, and emits the laser light 200, which is reflected, to the third lens 53. The first galvano mirror 57 changes an irradiation position of the laser light 200, which passes through the third lens 53, in accordance with an inclination angle of the first galvano mirror 57.

The second galvano mirror 58 reflects the other part of the laser light 200, and emits the laser light 200, which is reflected, to the second lens 52. The second galvano mirror 58 changes an irradiation position of the laser light 200, which passes through the second lens 52, in accordance with an inclination angle of the second galvano mirror 58.

The optical system 42 includes a melting device 45 that includes the first galvano mirror 57, the second galvano mirror 58, and the second lens 52. The melting device 45 forms a layer 110b and simultaneously performs an annealing process by heating the target 110 or the material 121 (123) that is supplied from the nozzle 33 to the target 110 through irradiation of the laser light 200.

In addition, the optical system 42 includes a removal device 46 that includes the first galvano mirror 57 and the third lens 53 and removes the material 121. The removal device 46 removes an unnecessary portion formed on the base 110a or in the layer 110b through irradiation of the laser light 200. For example, the removal device 46 removes a portion that is different from a predetermined shape of the additive manufactured object 100 such as an unnecessary portion that occurs scattering of the material 121 during supply of the material 121 by the nozzle 33, and an unnecessary portion that occurs during formation of the layer 110b. The removal device 46 emits the laser light 200 with a power density capable of removing the unnecessary portion.

The measurement device 16 measures a shape of the layer 110b that is solidified, and a shape of the additive manufactured object 100 that is manufactured. The measurement device 16 transmits information relating to the measured shape to the control device 17. For example, the measurement device 16 includes a camera 61 and an image processing device 62. The image processing device 62 perform image processing on the basis of information measured by the camera 61. Furthermore, the measurement device 16 measures the layer 110*b* and the additive manufactured object 100, for example, in accordance with an interferometry, a light-section method, and the like.

A moving device 71 (moving mechanism) moves the nozzle 33 in three axial directions perpendicular to each other, and two axial rotation directions.

The control device 17 is electrically connected to the moving device 13, the conveying device 24, the supply device 31, the supply device 31A, the discharge device 32, the light source 41, the galvano scanner 55, the image processing device 62, and the moving device 71 through a signal line 220.

The control device 17 controls the moving device 13 to move the stage 12 in three axial directions and two axial rotation directions. The control device 17 controls the conveying device 24 to convey the additive manufactured object 100 that is manufactured to the sub-chamber 22. The control device 17 controls the supply device 31 to adjust supply or non-supply, and a supply amount of the material 121. The control device 17 controls the discharge device 32 to adjust discharge or non-discharge, and a discharge amount of a powder of the material 121 or the fume. The control device 17 controls the light source 41 to adjust the power density of the laser light 200 that is emitted from the light source 41. The control device 17 controls the galvano scanner 55 to adjust the inclination angle of the first galvano mirror 57 and the second galvano mirror 58. In addition, the control device 17 controls the moving device 71 to control the position of the nozzle 33.

The control device 17 includes a storage unit 17*a*. For example, the storage unit 17*a* stores data representing a shape (reference shape) of the additive manufactured object 100 to be manufactured. In addition, the storage unit 17*a* stores data representing the height of the nozzle 33 and the stage 12 for each three-dimensional processing position (each point).

The control device 17 has a function of selectively supplying a plurality of the materials 121 different from each other from the nozzle 33, and adjusting (changing) a ratio of the plurality of materials 121. For example, the control device 17 controls the supply device 31 in order for the layer 110*b* of the materials 121 to be formed at a ratio based on data that is stored in the storage unit 17*a* and represents the ratio of each of the materials 121. According to this function, a gradient material (gradient function material), in which the ratio of the plurality of materials 121 varies (gradually increases or gradually decreases) in accordance with a position (location) of the additive manufactured object 100, can be manufactured. For example, in formation of the layer 110*b*, the control device 17 controls the supply device 31 to realize a ratio of the materials 121 which is set (stored) in correspondence with each position of three-dimensional coordinates of the additive manufactured object 100. According to this, it is possible to manufacture the additive manufactured object 100 as a gradient material (gradient function material) in which the ratio of the materials 121 varies in an arbitrary three-dimensional direction. A variation amount (variation rate) of the ratio of the materials 121 per unit length can be set in various manners.

The control device 17 has a function of determining the shape of the layer 110*b* or the manufactured object 100. For example, the control device 17 compares the shape of the layer 110*b* or the additive manufactured object 100 which is acquired by the measurement device 16, and the reference shape stored in the storage unit 17*a* to determine whether or not a portion in a shape other than a predetermined shape is formed.

In addition, the control device 17 has a function of trimming the layer 110*b* or the manufactured object 100 to a predetermined shape by removing an unnecessary portion that is determined as a portion that does not have a predetermined shape through the determination on the shape of the layer 110*b* or the manufactured object 100. For example, first, the control device 17 controls the light source 41 so that the laser light 200 emitted from the third lens 53 through the first galvano mirror 57 has a power density capable of evaporating the materials 121 at a portion that does not have the predetermined shape in the layer 110*b* or the additive manufactured object 100. Subsequently, the control device 17 controls the first galvano mirror 57 to irradiate a corresponding portion with the laser light 200, thereby evaporating the corresponding portion.

Figure 2:
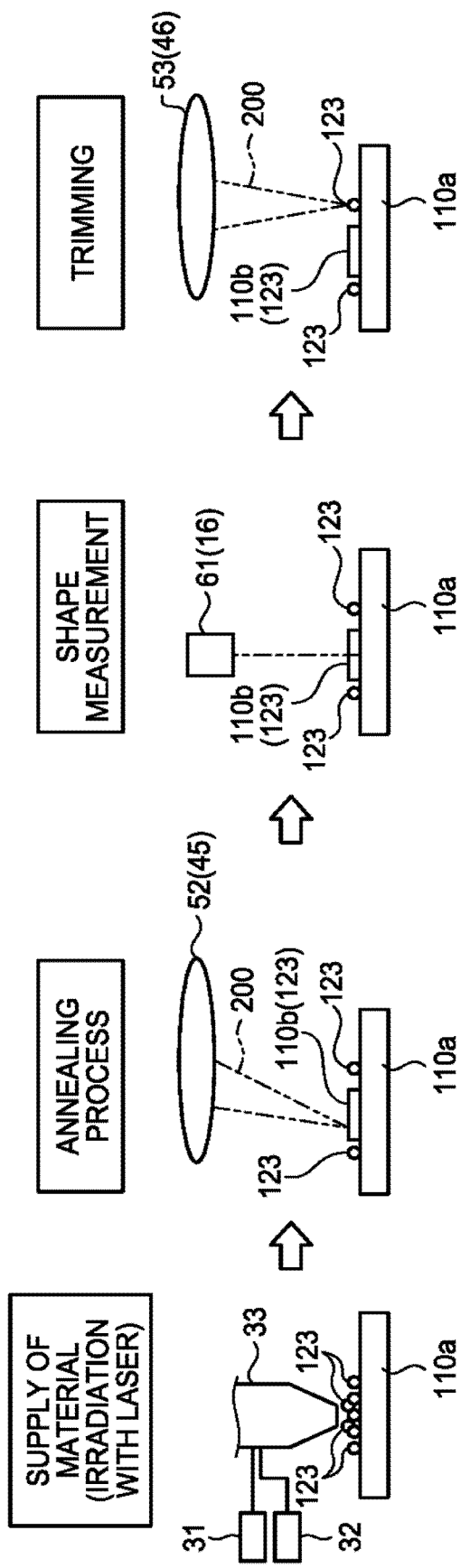
FIG. 2 is a view schematically illustrating an example of a manufacturing process by the additive manufacturing apparatus according to the first embodiment.

Next, description will be given of an example of a method of manufacturing the additive manufactured object 100 by the additive manufacturing apparatus 1 with reference to FIG. 2. FIG. 2 is a view schematically illustrating an example of a manufacturing process (manufacturing method) by the additive manufacturing apparatus 1.

As illustrated in FIG. 2, first, the additive manufacturing apparatus 1 performs supply of each of the materials 121 and irradiation with the laser light 200. The control device 17 controls the supply device 31 and the nozzle 33 so that the material 121 is supplied from the nozzle 33 to a predetermined range, and controls the light source 41 or the melting device 45 so that the material 121 that is supplied to be melted or sintered with the laser light 200. According to this, as illustrated in FIG. 2, a melted or sintered material 123 is supplied in a predetermined amount to a range of forming the layer 110*b* on the base 110*a*. When being sprayed to the base 110*a* or the layer 110*b*, the material 123 is deformed and becomes an aggregate of the material 123 such as a layer shape or a thin film shape. Alternatively, the material 123 is cooled down through heat transfer to an aggregate of the material 121, and is laminated in a granular shape and becomes a granular aggregate.

Next, the additive manufacturing apparatus 1 performs an annealing process. The control device 17 controls the light source 41 or the melting device 45 so that the aggregate of the material 123 on the base 110*a* is irradiated with the laser light 200. According to this, the aggregate of the material 123 is melted again, and becomes the layer 110*b*.

Next, the additive manufacturing apparatus 1 performs shape measurement. The control device 17 controls the measurement device 16 to measure the material 123 on the base 110*a* that is subjected to the annealing process. The control device 17 compares a shape of the layer 110*b* or the additive manufactured object 100 which is acquired by the measurement device 16, and the reference shape stored in the storage unit 17*a*.

Next, the additive manufacturing apparatus 1 performs trimming. For example, in a case where it is determined that the material 123 on the base 110*a* is attached to a position different from a predetermined shape through the shape measurement and the comparison with the reference shape, the control device 17 controls the light source 41 or the removal device 46 in order for an unnecessary portion of the material 123 to evaporate. On the other hand, in a case where it is determined that the layer 110*b* has a predetermined shape through the shape measurement and the comparison with the reference shape, the control device 17 does not perform the trimming.

When the formation of the layer 110b is terminated, the additive manufacturing apparatus 1 forms a new layer 110b on the corresponding layer 110b. The additive manufacturing apparatus 1 repetitively stacks the layer 110b to shape the additive manufactured object 100.

Figure 3:
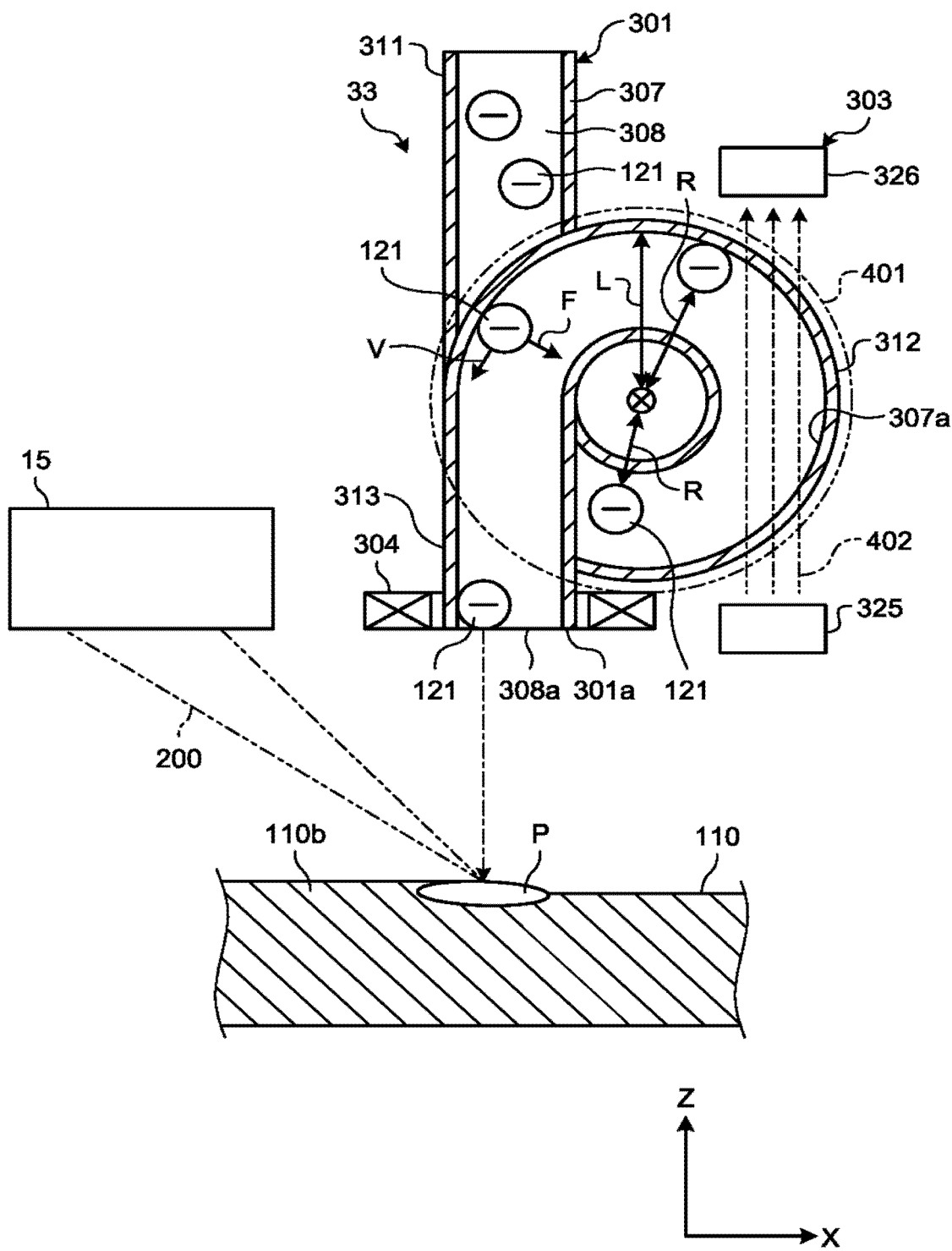
FIG. 3 is a cross-sectional view schematically illustrating a nozzle, an optical device, and a part of a target according the first embodiment.
Figure 4:
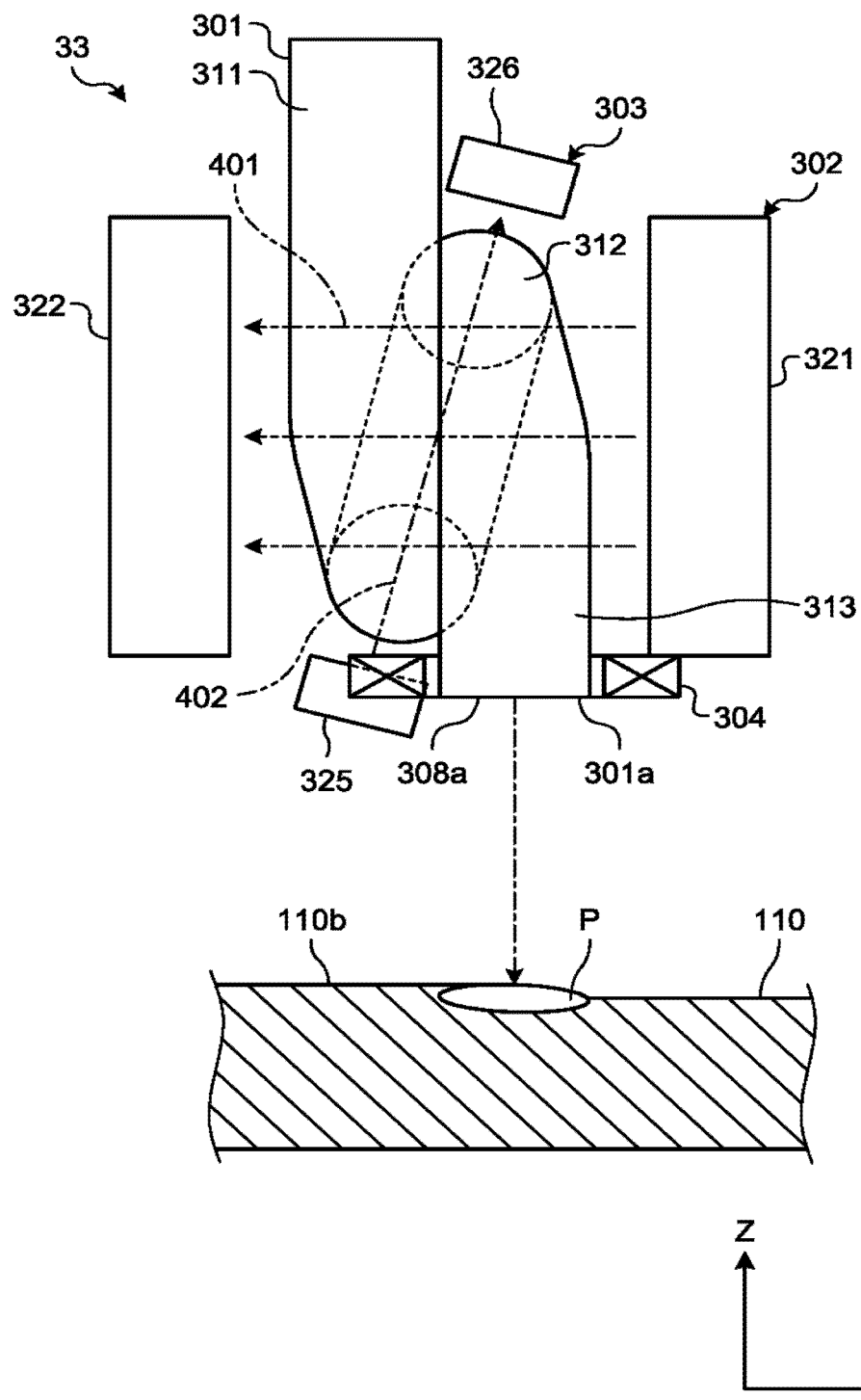
FIG. 4 is a side view schematically illustrating the nozzle and a part of the target according to the first embodiment.

Next, the nozzle 33 will be described in detail with reference to FIG. 3 and FIG. 4. FIG. 3 is a cross-sectional view schematically illustrating the nozzle 33, the optical device 15, and a part of the target 110. FIG. 4 is a side view schematically illustrating the nozzle 33 and a part of the target 110. As illustrated in FIG. 3 and FIG. 4, the nozzle 33 includes an injection section 301, a magnetic field generating section 302, an electric field generating section 303, and an adjustment section 304.

The injection section 301 is made of a material through which a magnetic field is transmitted, and is formed in a cylindrical shape which is partially wound in a helical shape. The injection section 301 includes a cylindrical wall portion 307 and a passage 308 that is formed at the inside of the wall portion 307. The passage 308 is a circular hole that is formed from one end to the other end of the injection section 301.

The injection section 301 includes a first straight portion 311, a spiral portion 312, and a second straight portion 313. The spiral portion 312 is an example of a guide. The magnetic field generating section 302, the electric field generating section 303, and the spiral portion 312 are an example of acceleration section. The second straight portion 313 is an example of an ejection section.

The wall portion 307 and the passage 308 of the injection section 301 are provided over the first straight portion 311, the spiral portion 312, and the second straight portion 313. The inner diameter (inner diameter of the passage 308) of the wall portion 307 is constant. Furthermore, the inner diameter of the wall portion 307 may be partially different.

The first straight portion 311 extends in a direction along the Z-axis. The first straight portion 311 is supplied with the material 121 from the supply device 31 through the supply tube 34. In other words, the supply device 31 supplies the material 121 to the passage 308 of the first straight portion 311 through the supply tube 34.

The spiral portion 312 is provided between the first straight portion 311 and the second straight portion 313. The spiral portion 312 is a part of the injection section 301 that surrounds helically a central axis that extends in a direction along the Y-axis. Furthermore, the spiral portion 312 in this embodiment is a portion that is wound around the central axis once, but may be a portion that is wound around the central axis a plurality of times. The external diameter of the spiral portion 312 that surrounds the central axis may be, for example, 100 mm. Furthermore, dimensions of the spiral portion 312 are not limited thereto.

The spiral portion 312 forms a passage 308, which is headed in a direction along the Y-axis while rotating around the periphery of the central axis. The passage 308 of the spiral portion 312 continues to the passage 308 of the first straight portion 311.

The second straight portion 313 extends in a direction along the Z-axis. The first straight portion 311 extends from one end of the spiral portion 312 to an upward side, but the second straight portion 313 extends from the other end of the spiral portion 312 to a downward side. That is, the second straight portion 313 extends in a direction opposite to a direction in which the first straight portion 311 extends. The passage 308 of the second straight portion 313 continues to the passage 308 of the spiral portion 312.

The second straight portion 313 forms an end 301a of the injection section 301. The end 301a of the injection section 301 downwardly faces the target 110 through a gap having a predetermined length. The second straight portion 313 includes an opening 308a of the passage 308 which is provided in the end 301a of the injection section 301. The opening 308a is an end of the passage 308 that is opened to the end 301a of the injection section 301.

The passage 308 of the injection section 301 as described above passes through the first straight portion 311 from one end that communicates with the supply tube 34, passes through the helically wound spiral portion 312, passes through the second straight portion 313, and reaches the opening 308a. As described above, the passage 308 of the first straight portion 311, the spiral portion 312, and the second straight portion 313 communicates with the opening 308a.

As illustrated in FIG. 4, the magnetic field generating section 302 includes a first magnet 321 and a second magnet 322. For example, the first magnet 321 and the second magnet 322 are electromagnets, but may be other magnets such as a permanent magnet. For example, the first magnet 321 and the second magnet 322 are respectively formed in a disk shape having a substantially the same radius. A central axis of each of the first magnet 321 and the second magnet 322, which have the disk shape, is substantially the same as the central axis of the spiral portion 312.

The first magnet 321 and the second magnet 322 face a direction along the Y-axis. In other words, the first magnet 321 and the second magnet 322 face a direction in which the central axis of the spiral portion 312 extends. The spiral portion 312 is located between the first magnet 321 and the second magnet 322. At least a part of the first straight portion 311 and the second straight portion 313 is disposed to deviate from a position between the first magnet 321 and the second magnet 322.

For example, the control unit 17 controls a driving circuit to generate a magnetic field in the first magnet 321 and the second magnet 322. According to this, the magnetic field generating section 302 generates a magnetic field 401 that faces the second magnet 322 from the first magnet 321. Furthermore, the magnetic field generating section 302 may generate a magnetic field that faces the first magnet 321 from the second magnet 322. For example, a voltage of 10,000 to 100,000 volts is applied to the first magnet 321 and the second magnet 322. Furthermore, the voltage that is applied to the first magnet 321 and the second magnet 322 is not limited thereto.

The spiral portion 312 is located in the magnetic field 401 generated by the first magnet 321 and the second magnet 322. FIG. 3 illustrates a portion, at which the magnetic field 401 is generated, in a state of being surrounded by a two-dot chain line, and illustrates a symbol indicating a direction of the magnetic field 401 at the central axis of the spiral portion 312. Furthermore, FIG. 3 illustrates the magnetic field 401 between the first magnet 321 and the second magnet 322, but a magnetic field is also generated at a position that deviates from a portion between the first magnet 321 and the second magnet 322.

The electric field generating section 303 includes a first electrode 325 and a second electrode 326. The first electrode 325 and the second electrode 326 face each other along a peripheral direction of the spiral portion 312. In this embodiment, a direction in which the first electrode 325 and the second electrode 326 face each other is inclined in accordance with the spiral portion 312.

The first electrode 325 and the second electrode 326 are located on an outer side of the spiral portion 312. A part of the spiral portion 312 is located between the first electrode 325 and the second electrode 326. Furthermore, the first electrode 325 and the second electrode 326 may be provided at the inside of the spiral portion 312.

For example, the control unit 17 controls a driving circuit to apply a voltage to the first electrode 325 and the second electrode 326 (to allow a current to flow thereto). According to this, the electric field generating section 303 generates an electric field 402 that faces the second electrode 326 from the first electrode 325. For example, a voltage of 10,000 to 100,000 volts is applied to the first electrode 325 and the second electrode 326. Furthermore, the voltage that is applied to the first electrode 325 and the second electrode 326 is not limited thereto. A part of the spiral portion 312 is located in the electric field 402 that is generated by the first electrode 325 and the second electrode 326.

For example, the adjustment section 304 is a coil that is disposed at the periphery of the second straight portion 313. The adjustment section 304 can be fluctuated with respect to the second straight portion 313. For example, the control unit 17 controls an actuator to fluctuate the adjustment section 304.

For example, the control unit 17 controls a driving circuit to allow a current to flow to the adjustment section 304 (to apply a voltage thereto). According to this, the adjustment section 304 generates a magnetic field in the vicinity of the opening 308a of the passage 308. When the adjustment section 304 is fluctuated, the magnetic field, which is generated by the adjustment section 304, is also fluctuated. In addition, the control unit 17 can control a direction of the current that flows to the adjustment section 304, and can control a direction of the magnetic field that is generated by the adjustment section 304.

The supply device 31 supplies the material 121 to the above-described nozzle 33. The supply device 31 supplies the material 121 to the injection section 301 of the nozzle 33 with various kinds of means such as gravity (free fall), compression, an electric field, and a magnetic field. For example, the supply device 31 accelerates the material 121 with an acceleration electric field, and supplies the material 121 to the injection section 301 of the nozzle 33 through the supply tube 34.

The material 121 may be accelerated by a carrier gas that is supplied by the supply device 31A to be supplied from the supply device 31 to the injection section 301. In this case, the carrier gas is discharged to an outer side before reaching the injection section 301. According to this, a difference in atmospheric pressure between an inner side and an outer side of the injection section 301 is reduced.

The material 121, which is supplied to the injection section 301, is charged with the charging unit 31c. A charge of the material 121 is, for example, 1 μC/kg. In addition, the supply device 31 supplies a predetermined amount of material 121 to the injection section 301. A density of the material 121 that is supplied is, for example, 7.8 g/cc. Furthermore, the charge and the density of the material 121 are not limited thereto.

The material 121 moves from the first straight portion 311 of the injection section 301 to the spiral portion 312. When entering the spiral portion 312 from the first straight portion 311, a position of the material 121 on a plane, which is formed by the X-axis and the Y-axis, is not constant. In addition, a velocity of the material 121 is also not constant.

When the material 121 enters the spiral portion 312, the material 121 enters the magnetic field 401 that is transmitted through the wall portion 307 of the spiral portion 312. The magnetic field 401 allows a Lorentz force F to act on the material 121 that is charged.

The material 121 has a velocity V in a direction (direction along the Z-axis) that intersects a direction of the magnetic field 401 along the Y-axis. In this case, the magnetic field 401 allows the Lorentz force F, which becomes a centripetal force, to the material 121 in order for the material 121 to circle around the magnetic field 401. In other words, the magnetic field 401 allows the material 121 to circle around in a direction that intersects the magnetic field 401. A direction, in which the material 121 rotates, is the same as a direction in which the spiral portion 312 is wound.

A motion radius R, which is a distance between the material 121 that circles around due to the magnetic field 401, and the circling center of the material 121 is expressed by the following Expression (1).

$$R = m \cdot V / (e \cdot B) \quad (1)$$

In Expression (1), m represents a mass of the material 121, e represents a charge of the material 121, and B represents a magnetic flux density that acts on the material 121.

On the other hand, the wall portion 307 of the spiral portion 312 extends to surround the rotational center of the circling material 121. In other words, the wall portion 307 of the spiral portion 312 surrounds the periphery of the material 121 that circles around.

An inner face of the wall portion 307 of the spiral portion 312 includes an outer end 307a that is the farthest portion from the central axis of the spiral portion 312. The outer end 307a extends in a helical shape with being spaced away from the central axis of the spiral portion 312 by a distance L.

The motion radius R of the material 121, which enters the spiral portion 312, is shorter than the distance L. Accordingly, the circling material 121 circles around with being spaced away from the outer end 307a of the wall portion 307. Furthermore, the motion radius R of the material 121, which enters the spiral portion 312, may be the same as or longer than the distance L.

On an inner side of the spiral portion 312, the material 121 enters the electric field 402 that is transmitted through the wall portion 307 of the spiral portion 312. The electric field 402 applies energy to the material 121 that is charged. In this manner, the electric field 402 accelerates the material 121 as an acceleration electric field.

The first electrode 325 and the second electrode 326 face each other along the peripheral direction of the spiral portion 312. Accordingly, a velocity V of the circling material 121 in the peripheral direction increases due to the electric field 402. As the velocity V increases, the motion radius R of the material 121 that circles around is also lengthened.

As the velocity V increases, the motion radius R of the circling material 121 is the same as or greater than the distance L. Accordingly, the circling material 121 circles around the magnetic field 401 along the outer end 307a of the wall portion 307.

The material 121 is guided to the wall portion 307 of the spiral portion 312, and moves in a direction along the Y-axis while circling. Furthermore, the material 121 is not limited thereto. For example, the nozzle 33 may generate an electric field in a direction along the Y-axis by electrodes. The circling material 121 may be moved to the direction along the Y-axis due to the electric field (drift electric field).

The material 121 moves along the outer end 307a of the wall portion 307, and enters the second straight portion 313 from the spiral portion 312. When entering the second straight portion 313, the material 121 gets out of the magnetic field 401. According to this, the Lorentz force F, which acts on the material 121, is reduced or disappears.

The material 121, which moves along the outer end 307a of the wall portion 307 of the spiral portion 312, moves along the wall portion 307 of the second straight portion 313 even when entering the second straight portion 313. Furthermore, in the second straight portion 313, the material 121 may move in a state of being spaced away from the wall portion 307.

The material 121 moves in a downward direction in which the second straight portion 313 extends. The material 121 is ejected from the opening 308a that is an end of the passage 308 toward the target 110. The material 121 is transported to the opening 308a of the passage 308 along the outer end 307a of the wall portion 307 of the spiral portion 312, and thus the material 121 is ejected from the opening 308a toward substantially the same direction from substantially the same position.

In a case where the control unit 17 allows a current to flow to the adjustment section 304, and fluctuates the adjustment section 304, the magnetic field of the adjustment section 304 acts on the material 121 that is ejected from the opening 308a. According to this, a direction of the material 121, which is ejected from the opening 308a, varies in accordance with the magnetic field of the adjustment section 304. The control unit 17 controls the current (voltage) and the direction of the adjustment section 304 to adjust the direction of the material 121 that is ejected from the opening 308a. Furthermore, the adjustment section 304 may adjust the direction of the material 121 by allowing an electric field to act on the material 121 that is ejected from the opening 308a.

The melting device 45 of the optical device 15 irradiates the target 110 with the laser light 200, and melts the material 121, which is supplied to the target 110, with the laser light 200. According to this, the material 123, which is melted, is supplied to the target 110. When the material 123 that is melted is supplied, or a surface of the target 110 is irradiated with the laser light 200, a molten pool P is formed in the target 110.

The nozzle 33 ejects the material 121 so that the material 121 and the laser light 200 face approximately the same site on the surface of the target 110. According to this, the nozzle 33 ejects the material 121 toward the molten pool P from the opening 308a.

The nozzle 33 may further include a device that sprays a shield gas, or a device that collects the material 121. The device that sprays the shield gas sprays the shield gas, which is supplied from the supply device 31A, toward the target 110 from the periphery of the injection section 301. The device that collects the material 121 suctions a powder of the material 121 and fume.

In the additive manufacturing apparatus 1 according to the first embodiment, the magnetic field generating section 302, the electric field generating section 303, and the spiral portion 312 allow the material 121 to circle around, and accelerate the material 121 so as to transport the material 121 to the opening 308a. Since a centripetal force or a centrifugal force such as the Lorentz force F acts on the circling material 121, it is easy to restrict the orbit of the material 121. For example, when a magnetic flux density B of the magnetic field 401, which is generated by the magnetic field generating section 302, is controlled, the motion radius R of the circling material 121 is controlled. In addition, for example, when the electric field generating section 303 accelerates the material 121, a deviation in the velocity of the material 121 is reduced, and a deviation in the orbit of the material 121 is also reduced. In addition to this, when the electric field generating section 303 accelerates the material 121, stoppage of circling of the material 121 is also suppressed. As described above, since the orbit of the material 121 converges due to the circling and acceleration, it is possible to guide the material 121 to the target without the carrier gas, and thus scattering of the material 121 due to the carrier gas, which broadens in the vicinity of the opening 308a due to a difference in atmospheric pressure between an inner side and an outer side of the opening 308a, is suppressed. Accordingly, the material 121 is supplied to the target in a more accurate manner.

The magnetic field generating section 302 generates the magnetic field 401 to allow the material 121 to circle around the magnetic field 401. The motion radius R of the material 121, which circles around the magnetic field 401, is obtained by Expression (1). As described above, since the orbit of the material 121 is approximately determined by the mass of the material 121, the velocity of the material 121, the charge of the material 121, and the magnetic flux density of the magnetic field 401, the material 121 is supplied to the target in a more accurate manner.

The electric field generating section 303 generates the electric field 402 to accelerate the circling material 121. According to this, a deviation in a velocity of the material 121 is reduced, and a deviation in the orbit of the material 121 is also reduced. In addition, since the material 121 can be accelerated without the carrier gas, scattering of the material 121 due to the carrier gas is suppressed. Accordingly, the material 121 is supplied to the target in a more accurate manner. In addition to this, when the material 121 is accelerated, the motion radius R of the material 121 is enlarged. When the motion radius R of the circling material 121 is enlarged, it is possible to transport the material 121 to the opening 308a by separating the material 121 from the magnetic field 401.

In addition, since the material 121 can be accelerated without the carrier gas, even when the main chamber 21 of the processing tank 11 is evacuated, it is possible to eject the material 121 from the opening 308a in a more accurate manner. When the main chamber 21 of the processing tank 11 is evacuated, mixing-in of impurities to the layer 110b of the target 110 is suppressed.

The material 121 is allowed to circle around along the spiral portion 312 that surrounds the rotational center of the circling material 121 due to the magnetic field 401 of the magnetic field generating section 302. As described above, since the orbit of the material 121 is restricted by the spiral portion 312, the material 121 is supplied to the target in a more accurate manner.

For example, the adjustment section 304 allows a magnetic field to act on the material 121 that is ejected from the opening 308a. The orbit of the material 121, which is ejected from the opening 308a, varies in accordance with the magnetic field of the adjustment section 304. As described above, since the orbit of the material 121 is controlled by the adjustment section 304, the material 121 is supplied to the target in a more accurate manner.

The charging unit 31c charges the material 121 that is supplied to the injection section 301. According to this, it is possible to control the orbit of the material 121 by the magnetic field 401 or the electric field 402, and thus the material 121 is supplied to the target in a more accurate manner.

Hereinafter, description will be given of the second embodiment with reference to FIG. 5 and FIG. 6. Furthermore, in the following description of a plurality of embodiments, the same reference numeral will be given of a constituent element having the same function as a constituent element that has been described already, and description thereof may be omitted. In addition, a plurality of constituent elements, to which the same reference numeral is given, are not limited to have every functions and properties which are common, and may have other functions and properties which are different in accordance with respective embodiments.

Figure 5:
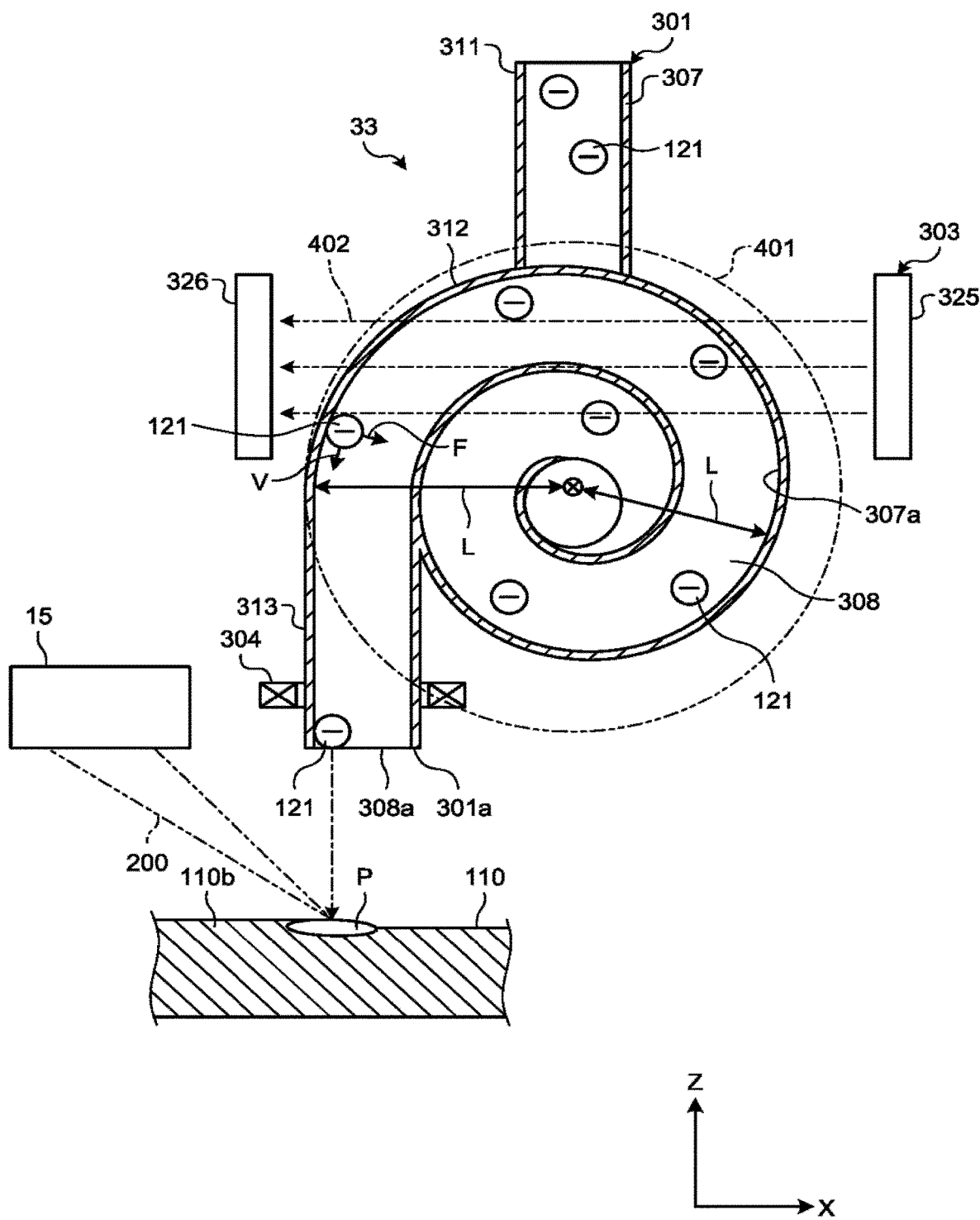
FIG. 5 is a cross-sectional view schematically illustrating a nozzle, an optical device, and a part of a target according to the second embodiment.
Figure 6:
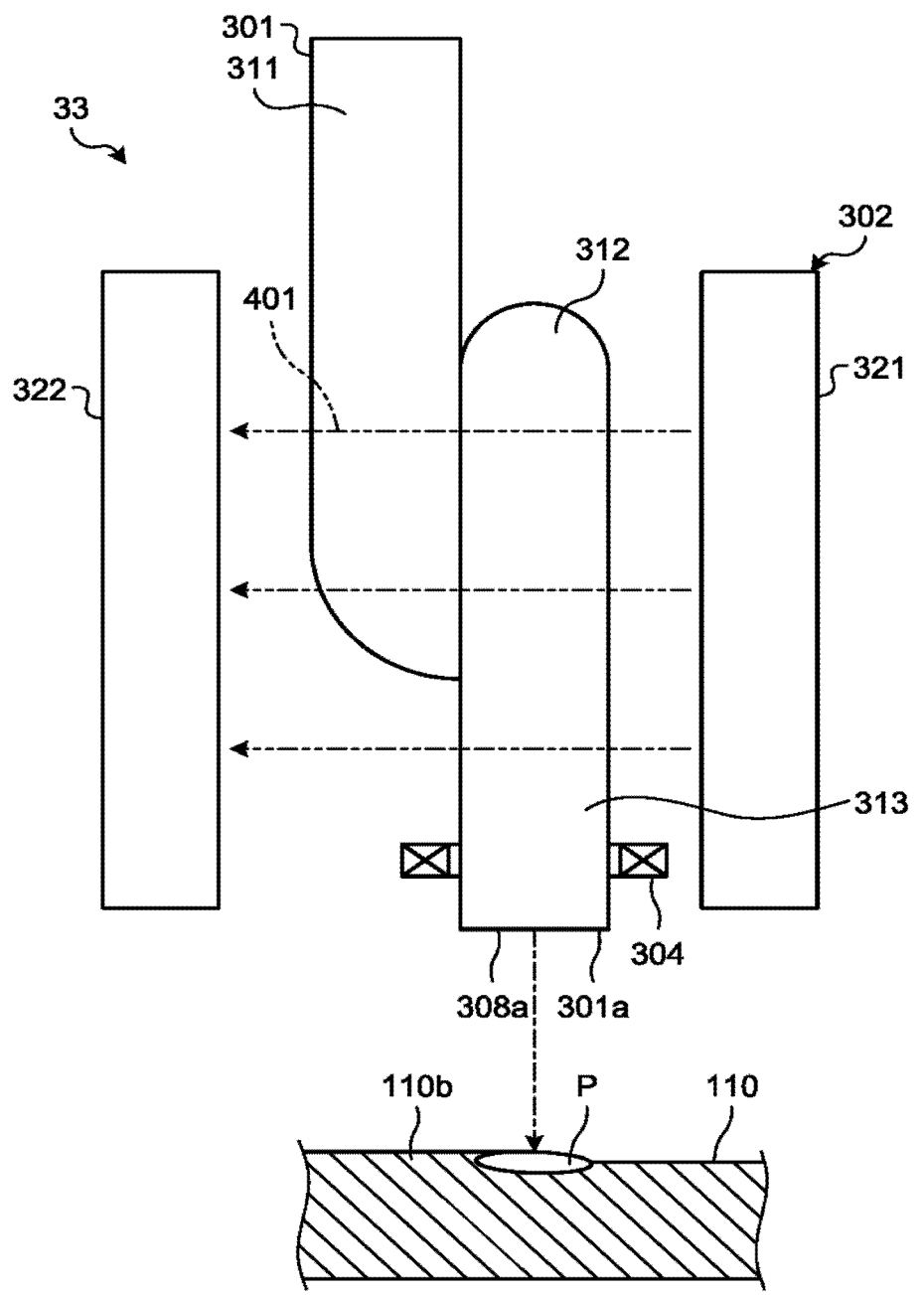
FIG. 6 is a side view schematically illustrating the nozzle and a part of the target according to the second embodiment.

FIG. 5 is a cross-sectional view schematically illustrating a nozzle 33, an optical device 15, and a part of a target 110 according to the second embodiment. FIG. 6 is a side view schematically illustrating the nozzle 33 and a part of the target 110. The shape of a spiral portion 312 of the second embodiment is different from the shape of the spiral portion 312 of the first embodiment.

The spiral portion 312 of the second embodiment is a part of an injection section 301 that is wound in a swirl shape around a central axis that extends in a direction along the Y-axis. The spiral portion 312 forms a passage 308, in which a distance with the central axis increases or decreases, while rotating around the periphery of the central axis. The passage 308 is wound in a planar shape that is formed by the Z-axis and the X-axis, and is not displaced in a direction along the Y-axis.

A passage 308 of a first straight portion 311 continues to an end (initiation point of a spiral) on an inner side of the passage 308 of the spiral portion 312. The end on the inner side of the passage 308 of the spiral portion 312 is provided at a position that slightly deviates from the central axis of the spiral portion 312. Furthermore, the end may be provided at substantially the same position as that of the central axis of the spiral portion 312. On the other hand, an end on an outer side of the passage 308 of the spiral portion 312 continues to a passage 308 of a second straight portion 313.

In the second embodiment, a part of the first straight portion 311 is located between a first magnet 321 and a second magnet 322 of the magnetic field generating section 302. Accordingly, the Lorentz force F acts on the material 121 that passes through the first straight portion 311. In addition, an end on an inner side of the passage 308 of the spiral portion 312 slightly deviates from the central axis of the spiral portion 312. Accordingly, the material 121, which enters the spiral portion 312 from the first straight portion 311, has a velocity V in a peripheral direction of a circle centering around the central axis of the spiral portion 312.

Since the material 121 has the velocity V in a direction that intersects a direction of a magnetic field 401, the material 121, which enters the spiral portion 312, circles around due to the Lorentz force F. A circling direction of the material 121 is the same as a direction in which the spiral portion 312 is wound.

On an inner side of the spiral portion 312, the material 121 enters an electric field 402, which is transmitted through a wall portion 307 of the spiral portion 312, a plurality of times. The electric field 402 accelerates the material 121 whenever the material 121 enters the electric field 402.

A motion radius R of the material 121 increases whenever the material 121 is accelerated by the electric field 402. On the other hand, as it goes toward a second straight portion 313, a distance L between an outer end 307a of the wall portion 307 of the spiral portion 312 and the central axis increases. That is, as it goes toward the second straight portion 313, the motion radius R of the material 121, and the distance L between the outer end 307a of the wall portion 307 and the central axis increase in combination with each other.

The material 121 is accelerated a plurality of times by the electric field 402, and thus the material 121 circles around the periphery of the magnetic field 401 along the outer end 307a of the wall portion 307. The material 121 moves along the outer end 307a of the wall portion 307, and enters the second straight portion 313 from the spiral portion 312. When entering the second straight portion 313, the material 121 gets out of the magnetic field 401. According to this, the Lorentz force F, which acts on the material 121, is reduced or disappears.

The material 121 moves in a downward direction in which the second straight portion 313 extends. The material 121 is ejected from an opening 308a that is an end of the passage 308 toward the target 110. As is the case with the first embodiment, the material 121 is transported to the opening 308a of the passage 308 along the outer end 307a of the wall portion 307 of the spiral portion 312, and thus the material 121 is ejected from the opening 308a toward substantially the same direction from substantially the same position.

In the additive manufacturing apparatus 1 of the second embodiment, the electric field generating section 303 accelerates the circling material 121 a plurality of times by the electric field 402. According to this, the material 121 is further accelerated, and stoppage of the material 121 in the spiral portion 312 is suppressed.

The spiral portion 312 is wound on a plane that intersects the magnetic field 401. According to this, it is not necessary for the material 121, which circles along the spiral portion 312, to move in a direction along the magnetic field 401. Accordingly, it is not necessary for the material 121 to be decelerated, or it is not necessary to provide a drift electric field for movement of the material 121.

Furthermore, the spiral portion 312 in the second embodiment is wound in a swirl shape from an inner side toward an outer side. However, the spiral portion 312 may be wound in a swirl shape from the outer side toward the inner side.

In addition, in the first and second embodiments, the electric field generating section 303 generates the electric field 402 in the constant direction. However, the electric field generating section 303 may change a direction of the electric field 402 at a predetermined frequency without limitation thereto. For example, when a frequency at which the material 121 circles around the half of the circumference of the spiral portion 312, and a frequency at which the direction of the electric field 402 varies are combined, the material 121 can be accelerated in a more effective manner.

In addition, in the first and second embodiments, the injection section 301 may not include the spiral portion 312. For example, in a case where the supply device 31 supplies the material 121, which has substantially the same mass m, substantially the same charge e, and substantially the same velocity V, to substantially the same position of the injection section 301, the orbit of the material 121, which circles around by the magnetic field 401 of the magnetic field generating section 302, becomes substantially the same. When the material 121, which circles around along the substantially the same orbit, is accelerated by the electric field 402 of the electric field generating section 303, the material 121 gets out of the magnetic field 401 and is ejected from the opening 308a. According to this, the material 121 is supplied to the target in a more accurate manner.

Figure 7:
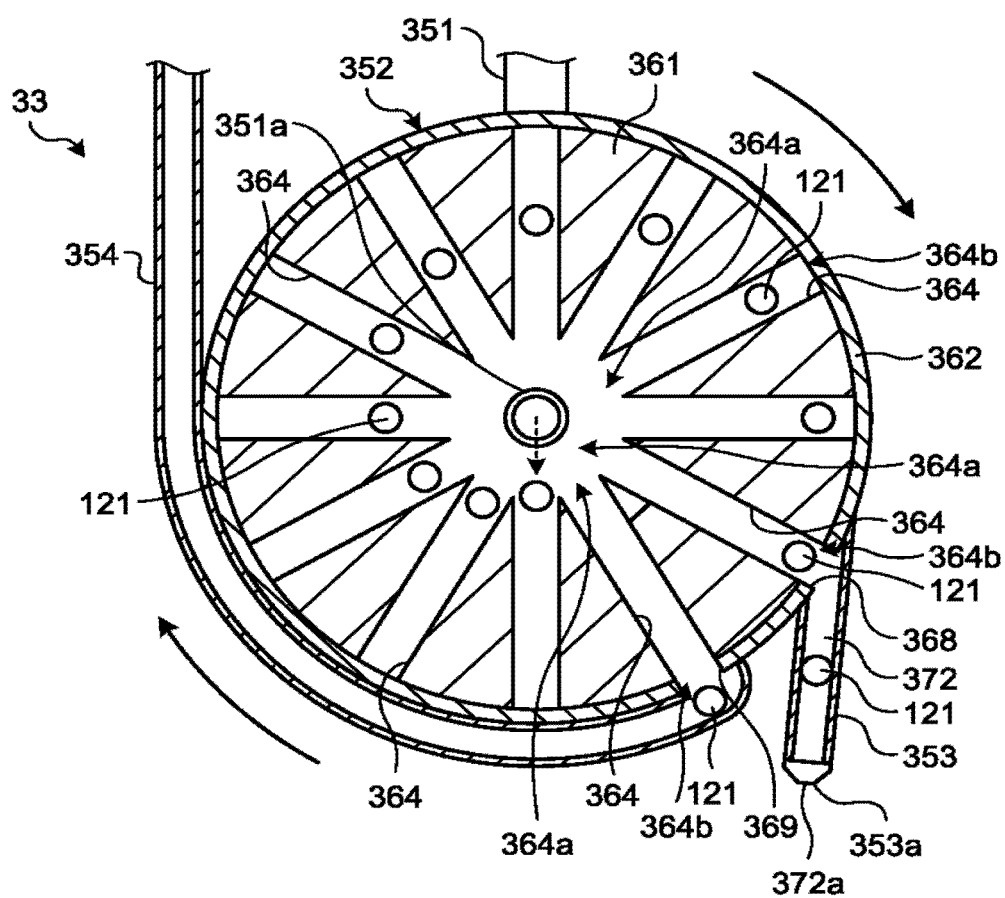
FIG. 7 is a cross-sectional view schematically illustrating a part of a nozzle according to the third embodiment.
Figure 8:
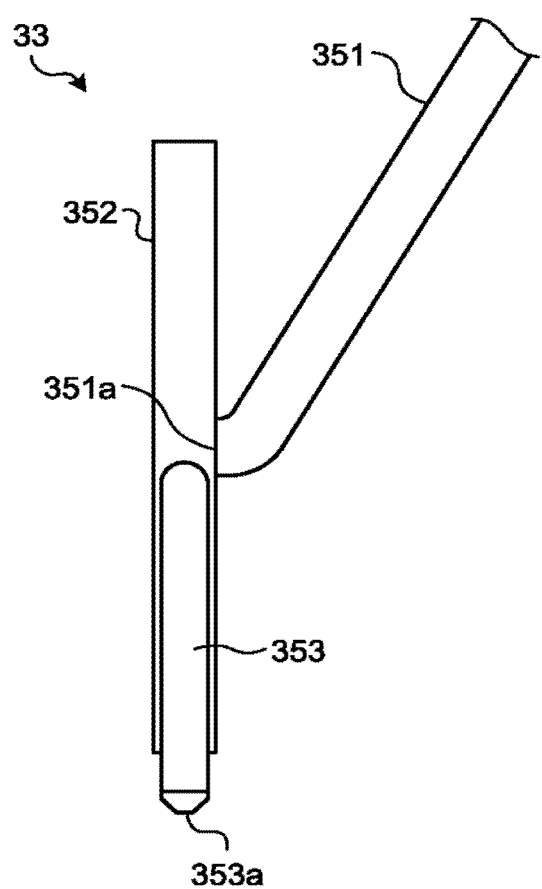
FIG. 8 is a side view schematically illustrating a part of the nozzle of the third embodiment.

Hereinafter, description will be given of the third embodiment with reference to FIG. 7 to FIG. 10. FIG. 7 is a cross-sectional view schematically illustrating a part of a nozzle 33 according to the third embodiment. FIG. 8 is a side view schematically illustrating a part of the nozzle 33 of the third embodiment. As illustrated in FIG. 7, the nozzle 33 of the third embodiment includes a supply unit 351, an acceleration section 352, an ejection section 353, and a discharge unit 354.

The supply unit 351 is a tube that is formed in a cylindrical shape. The supply unit 351 is connected to the supply device 31. The supply device 31 supplies the material 121 to the supply unit 351 through the supply tube 34. An end 351a of the supply unit 351 is connected to the acceleration section 352.

The acceleration section 352 includes a rotary body 361 and a peripheral wall 362. The rotary body 361 is formed in an approximately disk shape, and can rotate in a peripheral direction. For example, the control unit 17 controls a driving circuit to drive a motor, and the rotary body 361 is rotated by the motor. The rotary body 361 includes a plurality of passages 364.

The plurality of passages 364 are holes which radially extend from the center of the rotary body 361. In other words, the plurality of passages 364 extend from an inner side to an outer side of the rotary body 361. Furthermore, in this embodiment, the passages 364 extend linearly, but the passages 364 may extend, for example, in a curve shape. Each of the passages 364 includes an inner end 364a and an outer end 364b. A plurality of the inner ends 364a of the passages 364 are connected to each other at the central portion of the rotary body 361.

The end 351a of the supply unit 351 is opened at the center of the rotary body 361. Accordingly, the inner ends 364a of the plurality of passages 364 face the end 351a of the supply unit 351. Furthermore, the end 351a of the supply unit 351 may be opened at other positions.

The peripheral wall 362 surrounds the rotary body 361. Accordingly, the peripheral wall 362 blocks the outer end 364b of each of the passages 364. The peripheral wall 362 includes a connection port 368 and a discharge port 369. When the rotary body 361 rotates, and the outer end 364b of the passage 364 faces the connection port 368, the connection port 368 connects the passage 364 to the ejection section 353. When the rotary body 361 rotates, and the outer end 364b of the passage 364 faces the discharge port 369, the discharge port 369 connects the passage 364 to the discharge unit 354.

The discharge port 369 is located downstream of the connection port 368 in a rotation direction of the rotary body 361. Accordingly, when the rotary body 361 rotates, the outer end 364b of the passage 364 faces the connection port 368, and then faces the discharge port 369.

The ejection section 353 is a tube that is formed in a cylindrical shape. The ejection section 353 includes a passage 372. The passage 372 of the ejection section 353 is connected to the passage 364 of the rotary body 361 by the connection port 368.

The ejection section 353 includes an end section 353a. The end section 353a of the ejection section 353 downwardly faces the target 110 through a predetermined length of gap. The ejection section 353 includes an opening 372a of the passage 372, the opening 372a being provided in the end section 353a. The opening 372a is an end of the passage 372, and is opened at the end section 353a of the ejection section 353.

Figure 9:
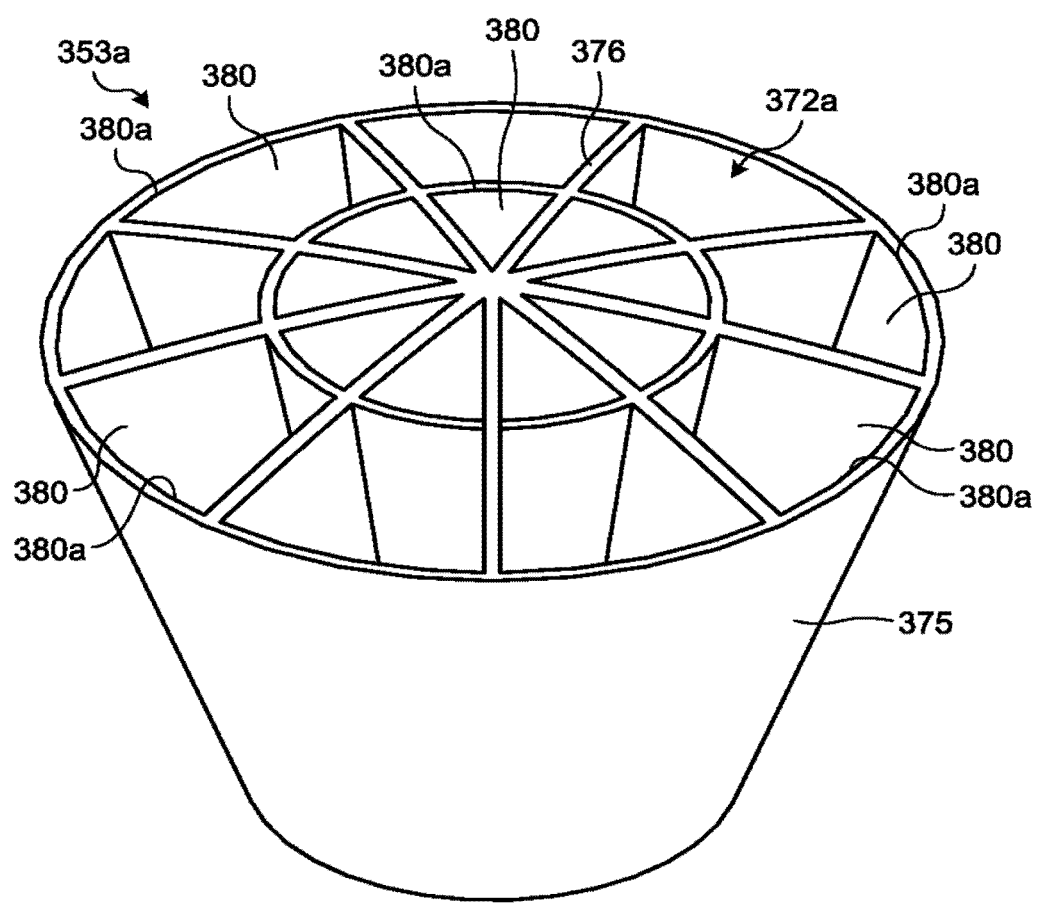
FIG. 9 is a perspective view illustrating an end section of an ejection section of the third embodiment.
Figure 10:
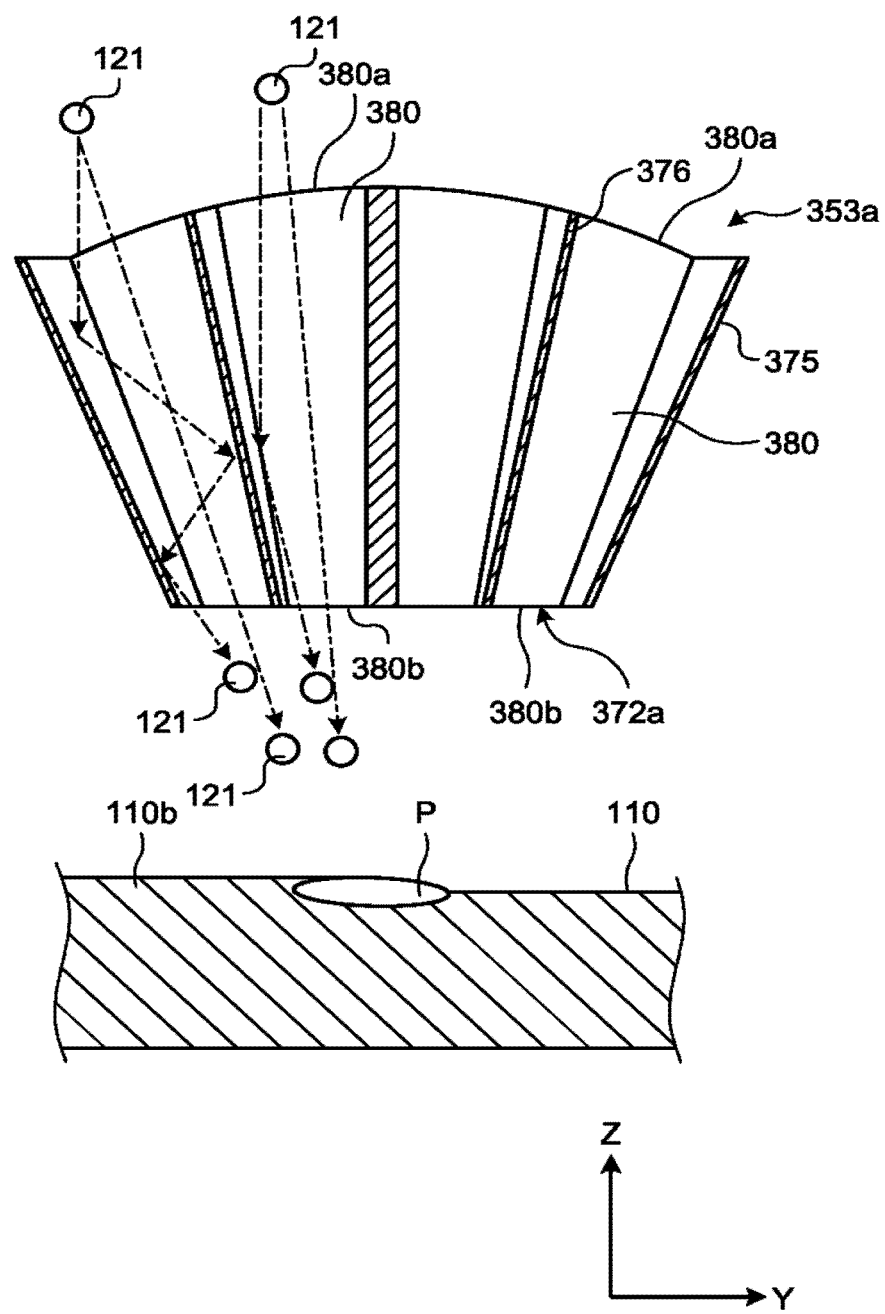
FIG. 10 is a cross-sectional view illustrating the end section of the ejection section and a target of the third embodiment.

FIG. 9 is a perspective view illustrating the end section 353a of the ejection section 353. FIG. 10 is a cross-sectional view illustrating the end section 353a of the ejection section 353 and the target 110. As illustrated in FIG. 9, the end section 353a of the ejection section 353 includes a peripheral wall portion 375 and a wall portion 376.

The peripheral wall portion 375 is formed in a tapered shape of which a diameter decreases as it goes toward the opening 372a. The wall portion 376 is provided on an inner side of the peripheral wall portion 375. The wall portion 376 partitions the opening 372a into a plurality of guide portions 380.

Each of the guide portions 380 includes an inlet 380a and an outlet 380b. The guide portion 380 is a hole of which a cross-sectional area decreases as it goes from the inlet 380a to the outlet 380b. The inlet 380a faces the passage 372 of the ejection section 353. The outlet 380b is located at a position opposite to the inlet 380a.

As illustrated in FIG. 10, the opening 372a faces the molten pool P that is irradiated with the laser light 200. The plurality of guide portions 380 extend to be adjacent to the common molten pool P as it goes from the inlet 380a to the outlet 380b. The molten pool is an example of a supply point. In other words, the plurality of guide portions 380 extend to converge as it goes from the inlet 380a to the outlet 380b.

The discharge unit 354 illustrated in FIG. 7 is a tube that is connected to the passage 364 of the rotary body 361 by the discharge port 369. The discharge unit 354 is connected to the discharge device 32 through the discharge tube 35.

In the additive manufacturing apparatus 1 including the above-described nozzle 33, the supply device 31 supplies the material 121 to the supply unit 351. The material 121 of this embodiment may not be charged by the charging unit 31c.

As indicated by an arrow in FIG. 7, the supply unit 351 supplies the material 121 from the center of the rotary body 361 to the passage 364. The material 121 enters the inner end 364a of the passage 364 which is located on a lower side, for example, due to gravity from the end 351a of the supply unit 351 which is opened to the center of the rotary body 361.

The control unit 17 allows the rotary body 361 to rotate at a constant angular velocity. Accordingly, a plurality of the passages 364, which are located on a downward side of the end 351a of the supply unit 351, are sequentially exchanged with each other. The supply unit 351 sequentially supplies the material 121 to the passages 364 which are exchanged with each other.

Since the rotary body 361 rotates, the material 121, which is supplied to each of the passages 364, circles around. When the material 121 circles around, a centrifugal force acts on the material 121. The material 121 moves from the inner end 364a toward the outer end 364b of the passage 364 due to the centrifugal force.

At timing at which the outer end 364b of the passage 364 of the rotary body 361 faces the connection port 368, the material 121 reaches the outer end 364b. The material 121 is transported from the connection port 368 to the passage 372 of the ejection section 353 due to the centrifugal force.

A distance r(t) from the inner end 364a of the passage 364 to the material 121 during rotation of the rotary body 361 is expressed by the following Expression (2).

$$r(t) = R(e^{\omega t} - e^{-\omega t})/e^{2\pi} \qquad (2)$$

In Expression (2), R represents a distance from the inner end 364a to the outer end 364b of the passage 364, e represents a natural logarithm, $\omega$ represents an angular velocity of the rotary body 361, and t represents time that has passed after the material 121 entered the passage 364. When using Expression (2), at timing at which the outer end 364b of the passage 364 faces the connection port 368, the angular velocity $\omega$ of the rotary body 361, at which the material 121 reaches the outer end 364b, is obtained. The control unit 17 allows the rotary body 361 to rotate at the angular velocity ω.

Since the rotary body 361 rotates, the circling material 121 has a velocity V in a peripheral direction of the rotary body 361. The velocity V of the material 121 is expressed by the following Expression (3).

$$V = r(t) \cdot \omega \quad (3)$$

From Expression (2) and Expression (3), it can be seen that as the material 121 is spaced away from the inner end 364a of the passage 364 due to the centrifugal force, the velocity V of the material 121 increases. The velocity V of the material 121 becomes the maximum when the material 121 reaches the outer end 364b of the passage 364. That is, the rotary body 361 allows the material 121 to circle around, and accelerates the material 121 by using the centrifugal force.

The material 121, which reaches the outer end 364b, enters the passage 372 of the ejection section 353 from the connection port 368. That is, the material 121 of which the velocity V becomes the maximum, is transported to the ejection section 353. Furthermore, the material 121 may be decelerated by interference with another material 121 or a frictional force.

The material 121 passes through the passage 372 of the ejection section 353 and reaches the opening 372a. As illustrated in FIG. 10, the material 121, which is transported from the passage 364 of the rotary body 361, enters the inlet 380a of any one of the guide portions 380 at various angles.

The material 121 passes through the guide portion 380, and is ejected from the outlet 380b toward the molten pool P of the target 110. The plurality of the guide portions 380 extend to be adjacent to the molten pool P as it goes toward the outlet 380b, and the material 121, which enters any one of the guide portions 380, moves toward the molten pool P. For example, when colliding with the peripheral wall portion 375 and the wall portion 376, a movement component of the material 121 in a direction different from a direction, which faces the molten pool P direction, is reduced, and the material 121 rebounds from the peripheral wall portion 375 and the wall portion 376 and goes to the molten pool P.

In the rotary body 361 in FIG. 7, the material 121 in the passage 364 may remain in the passage 364 without being transported to the ejection section 353. In this case, the rotary body 361 further rotates, and the outer end 364b of the passage 364 is connected to the discharge port 369. The material 121, which remains in the passage 364, is transported from the discharge port 369 to the discharge unit 354 due to the centrifugal force.

The discharge device 32 collects the material 121, which is transported from the passage 364 to the discharge unit 354, for example, through suction. The discharge device 32 may discharges the material 121 that is collected from the passage 364 to the tank 32c, or may return the material 121 to the tank 31a of the supply device 31 for reuse.

In the additive manufacturing apparatus 1 of the third embodiment, the acceleration section 352 rotates the rotary body 361. According to this, the material 121 is allowed to circle around and is accelerated, and is transported to the opening 372a of the ejection section 353. The orbit of the circling material 121 is approximately determined depending on the angular velocity ω of the rotary body 361. According to this, the material 121 is supplied to the target in a more accurate manner.

In addition, the material 121 can be accelerated without a carrier gas, scattering of the material 121 due to the carrier gas is suppressed. In addition, even when the main chamber 21 of the processing tank 11 is evacuated, it is possible to eject the material 121 from the opening 372a in a more accurate manner. When the main chamber 21 of the processing tank 11 is evacuated, mixing-in of impurities to the layer 110b of the target 110 is suppressed.

The supply unit 351 sequentially supplies the material 121 to the plurality of passages 364 of the rotary body 361. According to this, it is possible to shorten time taken until the material 121 is subsequently transported to the opening 372a of the ejection section 353 by the rotary body 361 after previous transportation of the material 121. Accordingly, the material 121 is supplied to the target in a more effective manner.

The wall portion 376 of the ejection section 353 partitions the opening 372a into the plurality of guide portions 380 each having the inlet 380a which the material 121 enters and the outlet 380b from which the material 121 is ejected. The plurality of guide portions 380 extend to be adjacent to the molten pool P which the opening 372a faces as it goes from the inlet 380a toward the outlet 380b. According to this, even when the material 121 enters the inlet 380a of any of the guide portions 380, the material 121 is ejected from the outlet 380b to be adjacent to the common molten pool P. Accordingly, the material 121 is supplied to the target in a more accurate manner.

According to at least one of the above-described embodiments, the acceleration section allows the powder to circle around so as to transport the powder to the opening. According to this, the powder is supplied to the target in a more accurate manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A nozzle comprising:
a first tube that extends straight and that includes a first end, a second end, and an opening at the first end from which a powder is configured to be ejected; and
an accelerator including a second tube that is spirally and/or helically wound and that is connected to the second end, the accelerator being configured to make the powder circle around along the second tube and being configured to accelerate the powder in a peripheral direction of the circling by the powder so as to transport the powder to the opening, the powder being directly made to circle around by a force of a magnetic field generated by at least one magnet, the powder being directly accelerated by a force of an electric field generated by at least one electrode,
wherein the accelerator is configured to make the powder converge to and move along an outer end of an inner face of the second tube while the powder is circling around so that the powder is ejected from an outer end of the opening in a direction where the first tube extends.

2. The nozzle according to claim 1,
wherein the accelerator includes a magnetic field generator having the at least one magnet that is configured to generate the magnetic field to make the powder circle around the magnetic field.

3. The nozzle according to claim 2,
wherein the accelerator further includes an electric field generator having the at least one electrode that is configured to generate the electric field to accelerate the powder that circles around.

4. The nozzle according to claim 2,
wherein
the magnetic field generator is configured to generate the magnetic field that makes the powder circle around the magnetic field along the outer end of the second tube.

5. The nozzle according to claim 2, further comprising:
an adjuster including a coil that is configured to allow at least one of the magnetic field and the electric field to act on the powder that is ejected from the opening.

6. The nozzle according to claim 1, wherein
an inner diameter of the first tube and an inner diameter of the second tube are constant.

7. The nozzle according to claim 1, wherein
the accelerator includes two magnets that are configured to generate the magnetic field to make the powder circle around the magnetic field,
the two magnets face each other along a direction in which a central axis of the spirally and/or helically wound second tube extends,
at least a part of the first tube is disposed to deviate from a position between the two magnets, and
the second tube is located between the two magnets.

8. The nozzle according to claim 7, wherein
the accelerator further includes two electrodes that are configured to generate the electric field to accelerate the powder that circles around,
a part of the second tube is located between the two electrodes, and
the two electrodes face each other along a peripheral direction of the spirally and/or helically wound second tube.

* * * * *